Jan. 15, 1963   B. TEBB ETAL   3,073,562
HYDRAULIC SUPPORTS

Filed March 20, 1961   2 Sheets-Sheet 2

INVENTOR:
BERNARD TEBB and
CLARENCE HERBERT PERRY
BY
Mead, Browne, Schuyler + Beveridge,
Attorneys

United States Patent Office 3,073,562
Patented Jan. 15, 1963

---

3,073,562
HYDRAULIC SUPPORTS
Bernard Tebb, Swanland, and Clarence Herbert Perry, Hull, England, assignors to Mastabar Mining Equipment Company Limited, Hull, England, a British company
Filed Mar. 20, 1961, Ser. No. 96,984
Claims priority, application Great Britain Apr. 19, 1960
2 Claims. (Cl. 248—354)

This invention concerns hydraulic supports of the type comprising an upper tubular member slidably engaged in a lower tubular member, the inner end of said upper tubular member comprising a hydraulic ram which co-operates with the lower tubular member to define a hydraulic pressure or working chamber adapted to receive a hydraulic medium under pressure, whereby said ram and upper tubular member are displaced relative to said lower tubular member and said support is caused to extend.

In such supports, the top end of the lower tubular member carries an annular seal to avoid the entry of foreign matter into the interior of the support, the seal being secured in position by a suitably flanged metal ring, known as a "neck ring," surrounding the top end of the tubular member and in turn secured thereto as by welding or by removable threaded screws. The neck ring also assists in locating in its proper position, a cylindrical bearing, for example of nylon, which is provided between the two tubular members for the purpose of accurately guiding the sliding motion of the upper member within the lower member. It has been found, however, that the disadvantage can arise, if the supply of hydraulic medium under pressure to the pressure chamber is continued after the prop has attained the maximum extension for which it is designed that the ram of the upper tubular member on contacting the cylindrical bearing, can cause the said bearing to exert a sufficient thrust on the neck ring to displace the same and the seal, and at the same time cause damage to the bearing itself.

According to the present invention, therefore, a neck ring for a hydraulic support of the type described is split, that is to say, is circumferentially discontinuous, and is provided with a radially inwardly projecting flange which is adapted to engage in a corresponding circumferential groove provided therefor in the wall of the outer tubular member of the support, said ring being provided with means for tightening it to clamp it securely around said tubular member.

The radially inwardly projecting flange is preferably located intermediate the end faces of the neck ring, while the tightening means may comprise either adjoining bored lugs provided one on each free end of the ring at the split therein and adapted for drawing together by a bolt passed through the lug bores, or a pair of aligned bores formed in the thickness of the ring itself, and one of which is threaded to receive a bolt passed through the other of said bores. A neck ring provided with tightening lugs may, for example, conveniently be produced from a forging, whereas a ring wherein the tightening means comprise bores formed in the thickness of the ring itself may be cut from a length of suitable tubing.

The invention will be described further by way of example, with reference to the accompanying drawings, in which.

Figure 1:
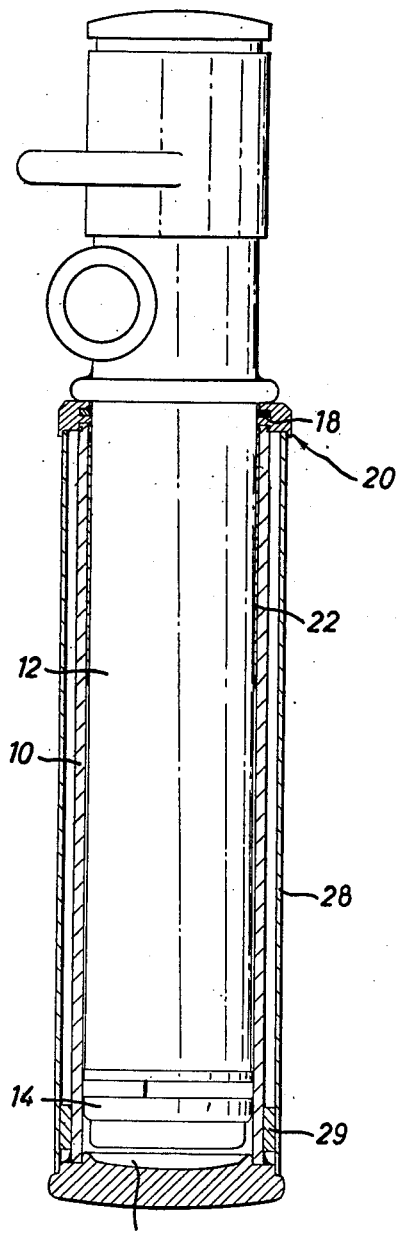
FIG. 1 is an elevation, partly in longitudinal section, of a hydraulic pit prop embodying the invention.

As shown in FIG. 1, the hydraulic pit prop comprises a lower tubular member 10 wherein is slidably engaged an upper tubular member 12 having its inner end constituting a hydraulic ram 14 which co-operates with the member 10 to define a hydraulic pressure chamber 16. The interior of the upper tubular member 12 serves as a reservoir for hydraulic medium, and also houses a hydraulic pump together with valve means by which the movement of hydraulic medium between the pressure chamber 16 and the reservoir is controlled. Such pumps and valve means are well known in the art and are not described or shown herein. On operation of the pump, hydraulic medium is forced under pressure into the chamber 16, and the upper member 12 is displaced upwardly within the lower member 10, thereby causing the prop to extend.

It will be noted that the upper end of the lower tubular member 10 is provided with an annular seal 18 intended to prevent the entry of foreign matter into the pit prop. This seal 18 is secured in position by a neck ring generally denoted 20 which also assists in properly locating a nylon bearing 22 provided between the tubular members 10 and 12. The nylon bearing 22 guides the sliding movement of the upper member 12 in the lower member 10, but is capable of being damaged if pumping is inadvertently continued after the normal maximum extension of the prop has been achieved. In such circumstances, the ram 14 contacts the lower end of the bearing 22, and applies an upward force to the bearing which is transmitted to the neck ring 20.

Figure 2:
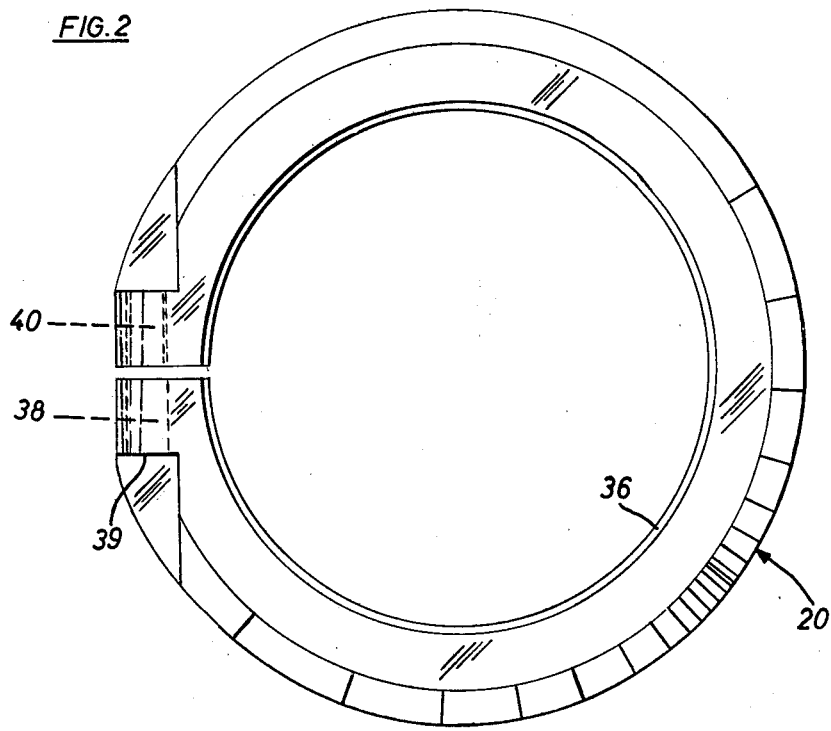
FIG. 2 is a plan view of the neck ring of said prop.
Figure 3:
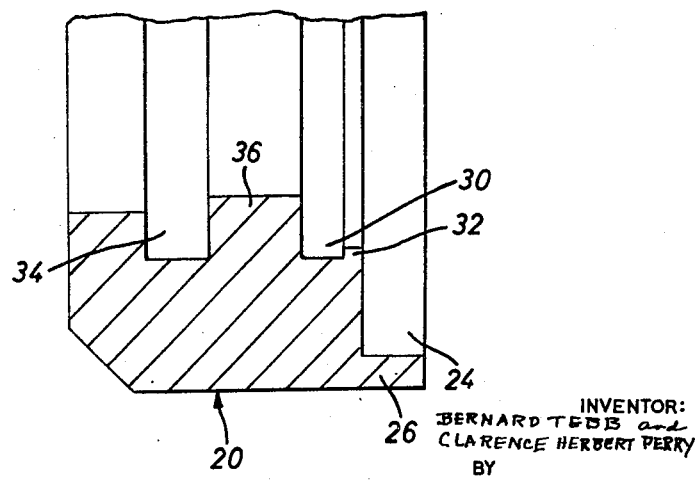
FIG. 3 is a sectional detail of said neck ring, taken to an enlarged scale.

The split neck ring 20 is shown in detail in FIGS. 2 and 3 will be seen to be formed around its bottom end face, with an annular recess 24 which extends radially outwardly from the inner cylindrical surface of the ring to terminate at such a position adjacent the outer cylindrical surface as to define an annular lower skirt 26 around the ring. The skirt 26 serves as a location for one end of an outer cylindrical cover 28 (FIG. 1) which is placed over the lower tubular member 10 of the prop to protect it from damage, as by accidental blows, the other end of the cover 28 being secured in spaced relation around the lower end of the tubular member 10, by means of a spacer collar 29.

Immediately above the recess 24, the inner cylindrical surface of the neck ring is provided with a shallow annular groove 30 which co-operates with the recess 24 in defining between them a radially inwardly projecting retaining flange 32 adapted, when the ring 20 is tightened, to engage in a correspondingly dimensioned annular groove provided in the wall of the lower tubular member 10 adjacent the upper end face thereof. A further annular groove 34 is formed in the neck ring, between the flange 32 and the upper end face of the ring, and defines a second radially inwardly projecting flange 36 which is adapted to seat on the upper end face of the tubular member 10 and to secure in position, the outwardly flanged upper end of the nylon bearing 22. The groove 36 of the neck ring serves to retain the dirt-excluding seal 18 which embraces the inner tubular member 12 of the support.

At its split ends, the neck ring 20 is bored at 38 and 40, the bore 38 terminating in an abutment 39 for the head of a threaded bolt or equivalent fastening member (not shown) and being of a diameter to permit free rotation of said member therein, and the bore 40 being threaded to receive the threaded stem of said fastening member. Thus, to position the ring 20 on the hydraulic pit prop, the threaded fastening member is disengaged from the threaded bore 40 of the ring, which can then be pried open and positioned on the prop with the retaining flange 32 of the ring engaged in the corresponding groove of the lower tubular member of the support. The fastening member is then tightened to clamp the ring securely on the tubular member 10, and acts to prevent the ring 20 from being displaced should any attempt be made accidentally to overextend the prop.

We claim:

1. In a hydraulic support of the type comprising an upper tubular member slidably engaged in a lower tubular member, and wherein the inner end of said upper tubular member constitutes a hydraulic ram which cooperates with the lower tubular member to define a hydraulic pressure chamber for receiving a hydraulic medium under pressure thereby to extend said support; the improvement comprising: a circumferentially discontinuous neck ring at the upper end region of the lower tubular member; said lower tubular member being formed with an external annular groove around said end region, a radially inwardly directed flange on said neck ring and engaged in said groove, and releasable fastening means for clamping said neck ring to said lower tubular member.

2. A hydraulic support comprising a lower tubular member; an upper tubular member slidably engaged in said lower tubular member; hydraulic ram means at the inner end of said upper tubular member; said hydraulic ram means co-operating with said lower tubular member to define a hydraulic pressure chamber for receiving hydraulic medium under pressure when the support is to be extended; a longitudinally split neck ring carried at the upper end region of the lower tubular member and extending upwardly beyond said lower tubular member to closely surround the upper tubular member; said lower tubular member being formed externally of said upper end region with a circumscribing groove and said neck ring being formed internally with a first annular recess adjoining one end face of said ring to define an annular skirt around said ring at said end face; said skirt closely surrounding said lower tubular member, a second annular recess adjacent and of lesser diameter than said first recess, said first and second recesses co-operating to define between them, a radially inwardly projecting flange engaged in said circumscribing groove, and a third annular recess between said second recess and the other end face of said ring; releasable fastening means for clamping said neck ring to said lower tubular member; a sealing ring housed in said third recess and engaging around said upper tubular member; and a cylindrical outer cover around said lower tubular member, said cover having one end located within said skirt and its other end secured in spaced relationship around the lower end of said lower tubular member.

References Cited in the file of this patent

UNITED STATES PATENTS

| | | |
|---|---|---|
| 2,042,443 | Buckstone | May 26, 1936 |

FOREIGN PATENTS

| | | |
|---|---|---|
| 542,887 | Belgium | Dec. 15, 1955 |
| 924,686 | Germany | Aug. 7, 1955 |
| 1,202,536 | France | July 20, 1959 |